(12) United States Patent
Pilla et al.

(10) Patent No.: US 11,990,017 B2
(45) Date of Patent: May 21, 2024

(54) THERMAL CAMERA AND INFRARED SENSOR BASED FLAME DETECTION

(71) Applicant: Honeywell International Inc., Charlotte, NC (US)

(72) Inventors: Surya Lakshmi Subba Rao Pilla, Bangalore (IN); Bindu Rani Ganesh, Bangalore (IN); Rodney Royston Watts, Portsmouth (GB)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 73 days.

(21) Appl. No.: 17/864,797

(22) Filed: Jul. 14, 2022

(65) Prior Publication Data

US 2024/0021059 A1    Jan. 18, 2024

(51) Int. Cl.
*G08B 17/12* (2006.01)
*G01J 5/00* (2022.01)
*G08B 29/04* (2006.01)
*G08B 29/20* (2006.01)

(52) U.S. Cl.
CPC .......... *G08B 17/125* (2013.01); *G01J 5/0018* (2013.01); *G08B 29/043* (2013.01); *G08B 29/20* (2013.01); *G01J 2005/0077* (2013.01)

(58) Field of Classification Search
None
See application file for complete search history.

(56) References Cited

U.S. PATENT DOCUMENTS

2020/0348446 A1    11/2020    Tremsin

FOREIGN PATENT DOCUMENTS

| CN | 102930686 A | 2/2013 |
|---|---|---|
| CN | 210442925 U | 5/2020 |
| CN | 111739250 A | 10/2020 |
| CN | 112542020 A | 3/2021 |
| CN | 113160513 A | 7/2021 |
| KR | 10-2015-0134095 A | 12/2015 |

OTHER PUBLICATIONS

Extended European Search Report Mailed on Jan. 25, 2024 for EP Application No. 23185156, 7 page(s).

*Primary Examiner* — Thomas S McCormack
(74) *Attorney, Agent, or Firm* — ALSTON & BIRD LLP

(57) ABSTRACT

Apparatuses, systems, methods, and computer program products for flame detection are provided. An example of a flame detection apparatus includes an infrared sensor to generate infrared sensor data and a thermal camera to capture one or more thermal images and generate thermal image data. The flame detection includes detecting if a flame is present in an environment based on the infrared sensor data and the thermal image data, including determining if one or more false alarms are present. The flame detection may also be based one or more spectral features or thermal features.

20 Claims, 5 Drawing Sheets

THERMAL CAMERA AND INFRARED SENSOR BASED FLAME DETECTION

TECHNOLOGICAL FIELD

Example embodiments of the present invention relate generally to flame detectors, and more particularly to flame detectors using thermal a thermal camera and an infrared sensor.

BACKGROUND

Flame detectors are used to detect the presence of a flame, such as in industrial environments containing combustible atmospheres. Examples of such industrial environments include oil and gas facilities, petrochemical plants, warehouses and storages yards for combustible materials, etc. A flame in such environments may lead to combustion and then rapid spread of a fire. Early detection of a flame is critically important to signal fire prevention and/or firefighting actions.

Flame detectors have used optical cameras, including infrared or ultraviolet cameras. These flame detectors, however, come with many limitations, including being prone to false alarms, particularly false alarms from radiation sources that are not flames. Examples of such radiation sources include heaters, welders, the sun, reflections (e.g., of sunlight, flames etc.), etc. Additionally, infrared flame detectors and ultraviolet flame detectors have their own disadvantages. For example, infrared detectors are affected by temperature and subject to false alarms from IR sources. Ultraviolet detectors are affect by smoke and oil vapors on optics.

As described herein, Applicant has identified a number of deficiencies, challenges, and problems associated with present flame detection apparatuses, systems, methods, and computer program products. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to apparatuses, systems, methods, and computer program products, specifically for flame detection.

In accordance with one aspect of the present disclosure, a flame detection apparatus is provided. In some instances, the flame detection apparatus comprises a thermal camera configured to generate thermal image data, an infrared sensor configured to generate infrared sensor data, and a processor operably connected with the thermal camera and the infrared sensor, wherein the processor is configured to receive thermal image data from the thermal camera; receive infrared sensor data from the infrared sensor; generate one or more spectral features based on at least one of the thermal image data and the infrared sensor data; generate a feature map based thermal image data; generate, based on the spectral features and the feature map, an indication of a flame present and an indication of a false alarm; determine an indication of flame detected based on the indication of flame present and the indication of a false alarm; and transmit, based on the indication of flame detected, an alarm signal.

In some instances, the infrared sensor is configured to generate infrared sensor data at 4.3 microns. In some instances of the flame detection apparatus, the infrared sensor is configured to generate infrared sensor data at 2.7 microns. In some instances, the thermal camera is configured to generate thermal image data between 3 to 14 microns. In some instances, the spectral features include a flicker characteristic. In some instances, the spectral features include one or more areas of interest, wherein the area of interest is determined for one or more thermal images based on the infrared sensor data. In some instances, the flame detection apparatus further comprises a transmitter configured to transmit a 4-20 mA signal, and wherein the process is further configured to transmit the alarm signal as the 4-20 mA signal.

In accordance with another aspect of the present disclosure, a method of flame detection is provided. In some instances, the method comprises receiving thermal image data from a thermal camera; receiving infrared sensor data from an infrared sensor; generating one or more spectral features based on at least one of the thermal image data and the infrared sensor data; generating a feature map based thermal image data; generating, based on the spectral features and the feature map, an indication of a flame present and an indication of a false alarm; determining an indication of flame detected based on the indication of flame present and the indication of a false alarm; and transmitting, based on the indication of flame detected, an alarm signal.

In some instances of the method of flame detection, the infrared sensor is configured to generate infrared sensor data at 4.3 microns. In some instances, the infrared sensor is configured to generate infrared sensor data at 2.7 microns. In some instances, the thermal camera is configured to generate thermal image data between 3 to 14 microns. In some instances, the spectral features include a flicker characteristic. In some instances, the spectral features include one or more areas of interest, wherein the area of interest is determined for one or more thermal images based on the infrared sensor data. In some instances, transmitting the alarm signal comprises transmitting a 4-20 mA signal.

In accordance with another aspect of the present disclosure, a computer program product may be provided for flame detection. In some instances, the computer program product comprises receiving thermal image data from a thermal camera; receiving infrared sensor data from an infrared sensor; generating one or more spectral features based on at least one of the thermal image data and the infrared sensor data; generating a feature map based thermal image data; generating, based on the spectral features and the feature map, an indication of a flame present and an indication of a false alarm; determining an indication of flame detected based on the indication of flame present and the indication of a false alarm; and transmitting, based on the indication of flame detected, an alarm signal.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF SUMMARY OF THE DRAWINGS

Figure 1:
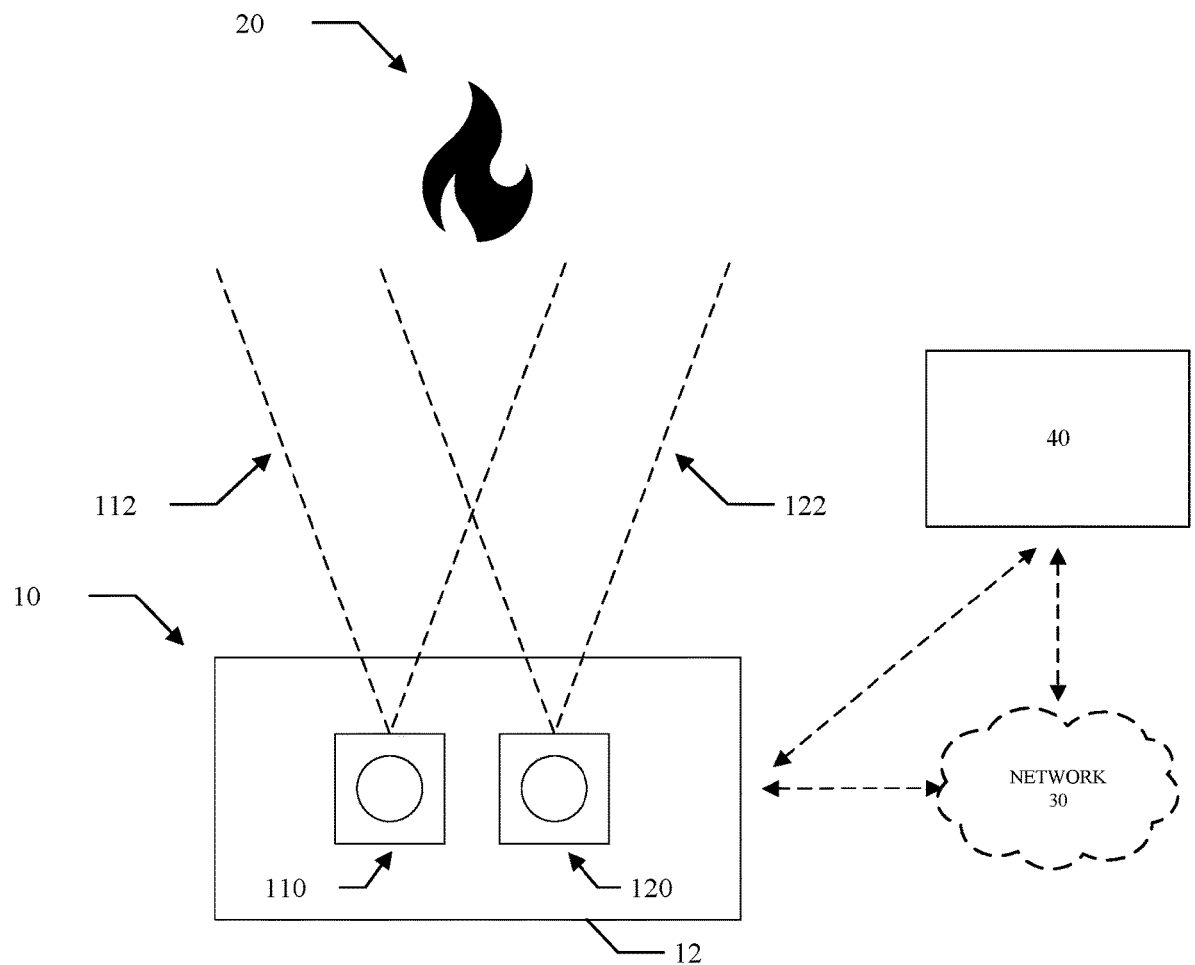
Figure 2:
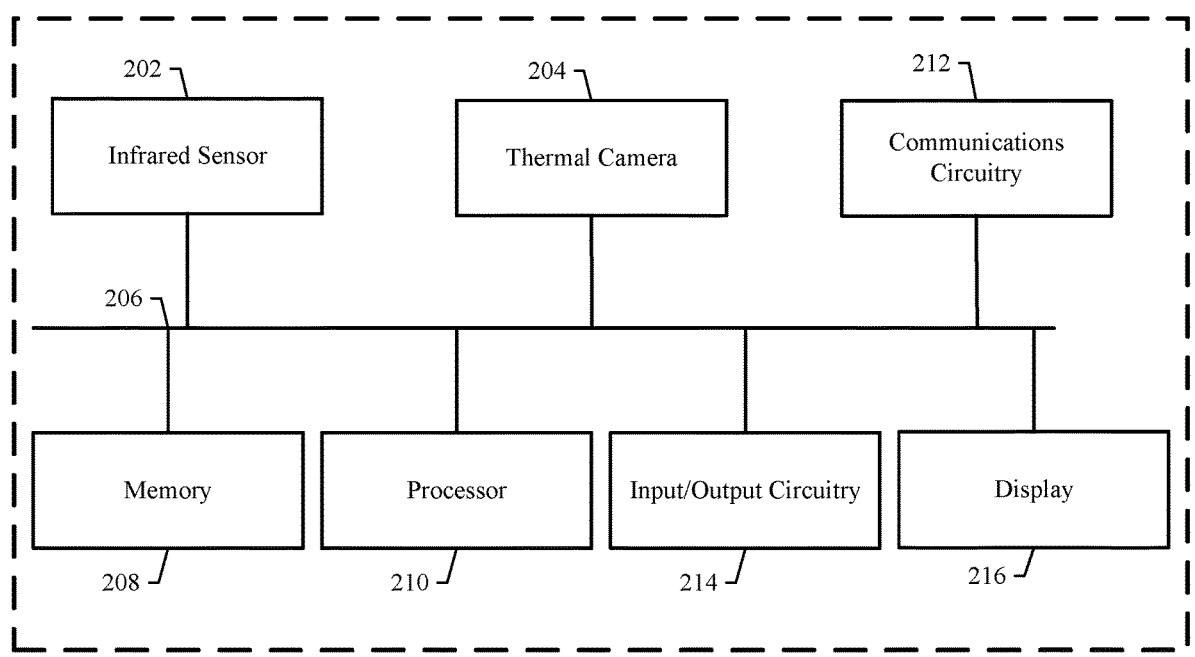
Figure 3:
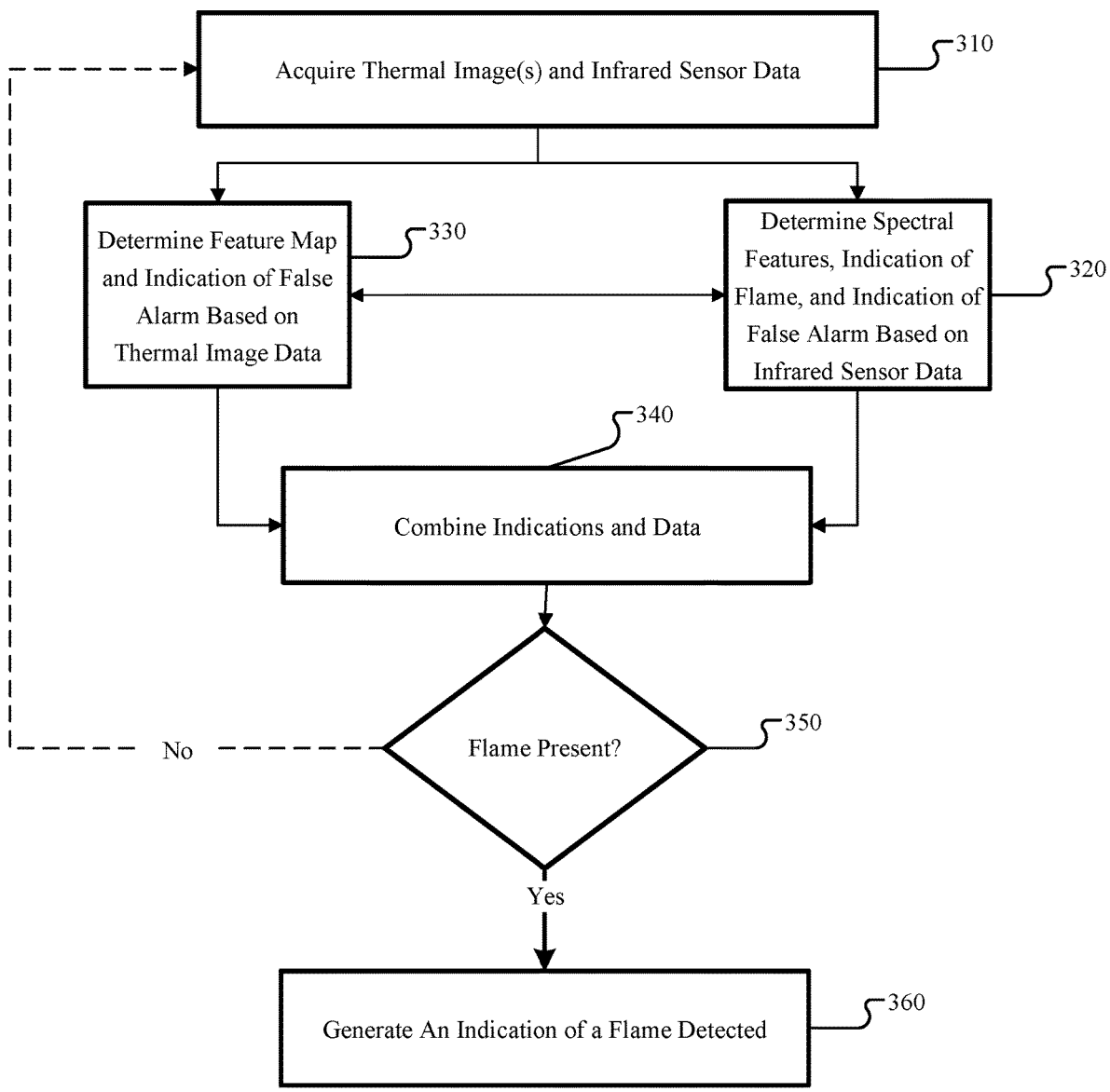
Figure 4:
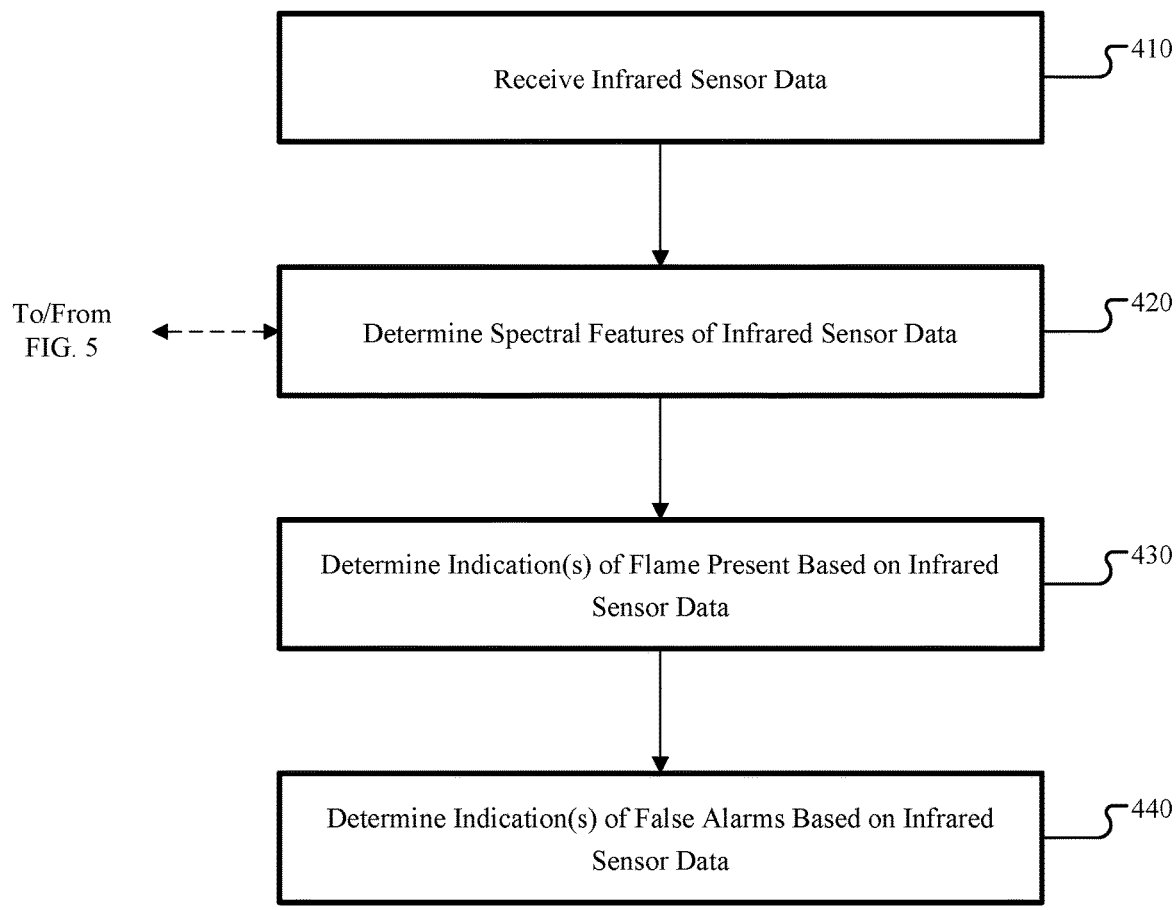
Figure 5:
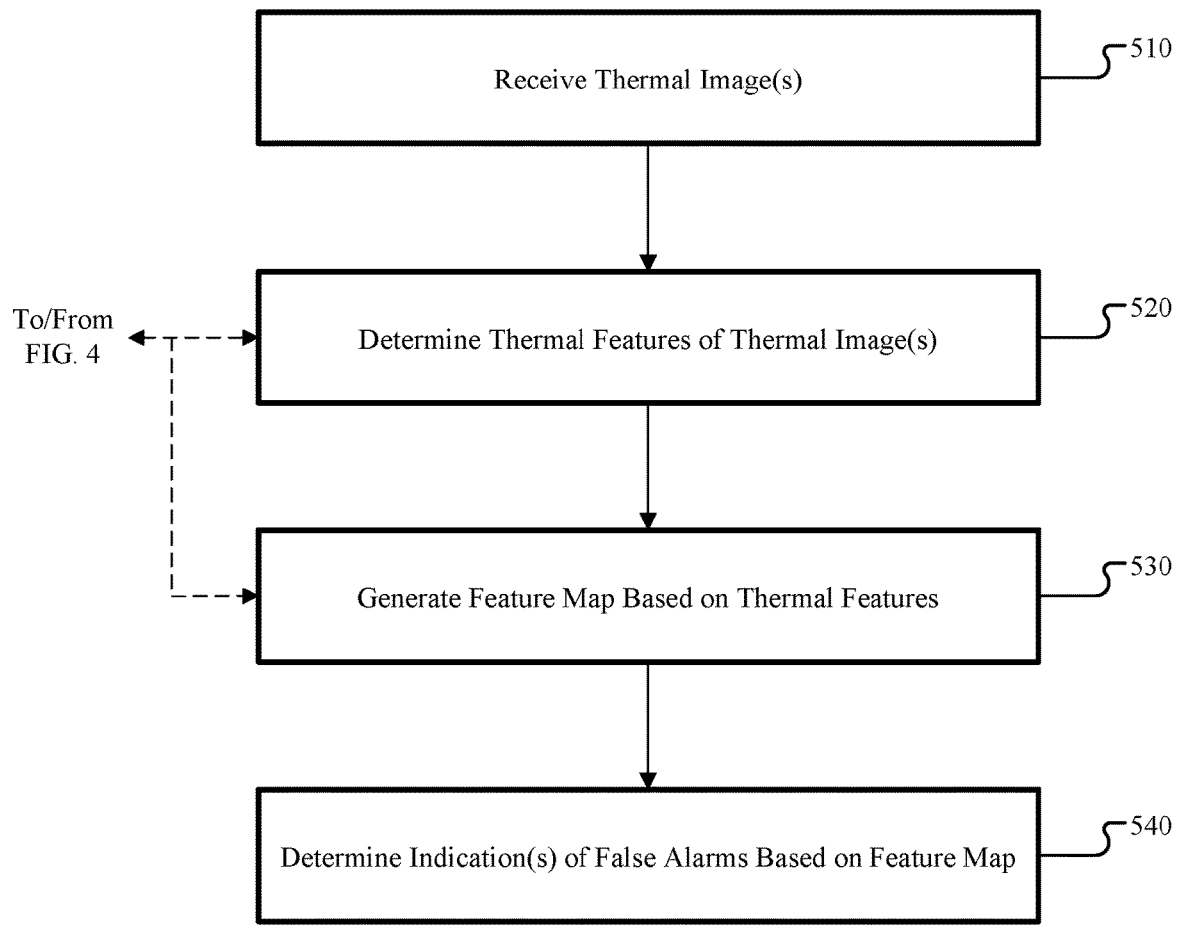

Having thus described certain example embodiments of the present disclosure in general terms, reference will now be made to the accompanying drawings, which are not necessarily drawn to scale, and wherein:

FIG. 1 illustrates an example environment including a flame detector in accordance with one or more embodiments of the present invention;

FIG. 2 illustrates an example block diagram of an example flame detector in accordance with one or more embodiments of the present disclosure;

FIG. 3 illustrates a flowchart according to an example method for generating an indication of flame detected in accordance with one or more embodiments of the present disclosure;

FIG. 4 illustrates a flowchart according to an example method for determining indications of a flame and indication of false alarms based on infrared sensor data in accordance with one or more embodiments of the present disclosure; and FIG. 5 illustrates a flowchart according to an example method for determining indications of false alarms based on thermal data in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Exemplary Flame Detector

Various embodiments of the present invention are directed to improved flame detection apparatuses, systems, methods, and computer program products for flame detection, and more particularly to flame detectors using thermal imaging and infrared imaging.

In various embodiments of the improved flame detectors described herein, a flame detector may be used to generate and transmit one or more output signals that a flame has been detected (or has not been detected) in an environment. Such signals may be the basis for the mitigation or the escalation of responses associated with the risk of a flame being present, which may cause materials in an environment to ignite resulting in a fire or an explosion. Thus the presence of a flame is a risk to individuals and equipment in the environment being monitored with a flame detector. The flame detectors described herein protect lives and equipment, including through alerting individuals to evacuate an area or to respond to a flame. This may include the shutdown of equipment or the starting or ceasing of various operations. While many examples of the present invention may be described herein in regard to environments in the oil and gas industry, the flame detectors described herein are applicable to any environment utilizing a flame detector are not restricted to the examples described herein.

Embodiments of a flame detector according to the present invention include one or more infrared (IR) cameras and one or more thermal cameras. An infrared sensor may include one or more infrared detectors. For example, there may be a single IR sensor, a dual IR sensor, a triple IR sensor, etc. The infrared sensor may be used to capture infrared radiation from an environment and generate infrared sensor data, from which spatial information and spectral information about an environment may be determined. Such information may include where a flame may be located in the infrared sensor's field of view. In various embodiments, infrared sensor data includes the intensity of infrared radiation received by the infrared sensor. A thermal camera may be used to capture thermal images containing thermal image data. The infrared sensor may generate infrared sensor data of an environment and the thermal camera may generate thermal images of an environment, including thermal image data, at regular increments and over one or more periods of time. In various embodiments, the infrared sensor and the thermal camera may generate data at a rate of 60 Hz. The thermal image data and the infrared sensor data may be used and combined to provide an improved flame detection, including improved identification and elimination false alarms.

FIG. 1 illustrates an example environment including a flame detector 10 in accordance with one or more embodiments of the present invention. Flame detector 10 may be used to detect a flame 20 within the field of view 112 of the infrared sensor 110 and the field of view 122 of the thermal camera 120. These fields of view 112, 122 overlaps for an area being monitored. The flame detector 10 may have a housing 12 that includes the infrared sensor 110 and the thermal camera 120. The housing 12 may also include additional components as described herein. The flame detector 10 may generate one or more output signals, including an indication of a flame detected signal. Such signals may be transmitted, either directly or indirectly, to a protection device 40. In various embodiments, providing a signal indirectly includes providing it over a network 30.

In some embodiments, the network 30 may include any wired or wireless communication network such as, for example, a wired or wireless local area network (LAN), personal area network (PAN), wide area network (WAN), or the like. The network 30 may include any hardware, software, and/or firmware required to implement the network 30 (such as, e.g., network routers, etc.). In various embodiments, the network 30 may include a closed loop network, a Wi-Fi network, and/or WiMax network. In various embodiments, a first wireless and/or wired network may be backed up by a second wired and/or wireless network. Further, the network 30 may include a public network (such as the Internet), a private network (such as an intranet), a closed loop network, etc. The network 30 may utilize a variety of networking protocols, such as, for example, TCP/IP based networking protocols, milliamp (mA), etc. Moreover, a networking protocol may be customized to suit the needs of the flame detector 10 or the environment in which the flame detector operates. Based on the network 30, the flame detector 10 may include one or more transmitters that may be configured to communicate over the network 30. For example, the flame detector 10 may include one or more 4-20 mA transmitters.

A protection device 40 may include one or more devices that may receive one or more signals from the flame detector 10. In various embodiments, protection device 40 may include one or more computing devices that may use one or more signals from the flame detector 10 to generate an alarm, control or operate equipment, etc. For example, the protection device 40 may include a programmable logic control (PLC) or a relay, which may be in a panel or cabinet. In various embodiments, the protection device 40 may be a fire alarm control panel or an emergency shutdown system(s). A signal from the flame detector 10 may be transmitted directly to protection device 40 or over a network 30 to protection device 40. The protection device 40 may operate one or more pieces of equipment (not illustrated) based on the signal(s). In various embodiments, a signal may be a binary signal that is coded for if a flame is detected or not detected. In various embodiments other signals may be used to transmit additional data associated with the detection of a flame or a false alarm. After receiving a signal corresponding to an indication of a flame being detected, protection device 40 may cause the operation of a fire protection system or the shutdown of one or more pieces of equipment.

In various embodiments, the flame detector 10 may have a housing 12 that is suitable for the environment it is operating in and that is being monitored. For example, the housing 12 may be waterproof, dustproof, vaporproof, explosion proof, etc. The rating of the housing may be in accordance with one or more industry standards for housings. In various embodiments, the housing 12 may be fixed mount such that the flame detector 10 may be mounted to a location and/or a piece of a equipment. Alternatively, or additionally, the housing 12 may be a handheld housing allow for the operation of the flame detector 10 by hand. The housing 12 may include one or more windows, such as one window through which an infrared sensor and a thermal camera may monitor an environment. Alternatively, the housing 12 may include more than one window, such as one window associated with the infrared sensor and one window associated with the thermal camera. The housing 12 may include one or more ports for connecting wired output(s) and/or input(s).

FIG. 2 illustrates an example block diagram 200 of a flame detector 10 in accordance with one or more embodiments of the present disclosure. Flame detector 10 may include one or more components illustrated in FIG. 2, which may be located in a housing 12. It is appreciated that various embodiments may also omit one or more components illustrated in FIG. 2. For example, flame detector 10 may include one or more infrared sensors 202, one or more thermal cameras 204, memory 208, processor 210, communication circuitry 212, input/output circuitry 214, and display 216, which may be connected via bus 206. In various embodiments, infrared sensor 202 and thermal camera 204 may be included in a camera module (not illustrated). Such a camera module may allow for the physical swapping of modules in a flame detector 10 while keeping the remainder of the components the same.

Flame detector 10 may include one or more infrared sensors 202. In various embodiments, infrared sensor 202 may be a single infrared sensor. Alternatively, infrared sensor 202 may be two or more infrared sensors. In various embodiments, an infrared sensor may comprise a single infrared sensor, dual infrared sensors, triple infrared sensors, etc. within one infrared sensor 202. In various embodiments, an infrared sensor may have spectral sensitivity from microns to 5 microns. In various embodiments, the thermal camera may be configured to have a spectral sensitivity at a narrower range or at specific value. In various embodiments, the thermal camera 202, including the infrared sensor(s) in the infrared sensor 202, may be configured to detect one or more spectral sensitivities associated with strong emission(s) of gasses. For example, the spectral sensitivity may be configured for 2.7 microns and/or 4.3 microns, which are associated with the strong emissions of CO2 and hot water emissions, respectively, during a fire. Various embodiments may configure a flame detector 10 by using one or more filters, such as bandpass filters, to narrow a spectral sensitivity of a flame detector 10 when one or more infrared sensors have a broader range of spectral sensitivity. The infrared sensor 202 may observe an environment by receiving radiation from the environment and generating infrared sensor data. As described herein, the flame detector may detect a flame based at least one such infrared sensor.

In an exemplary embodiment, flame detector 10 includes an infrared sensor 202 with a single band infrared sensor/ The single band infrared sensor may be configured for a spectral sensitivity with a range including 4.3 microns so that the single band infrared sensor may detect an emission from hot CO2 from fire.

The infrared sensor 202 may be configured for spectral sensitivity utilizing using one or more bands. In some embodiments, there may a main band and one or more side bands. For example, an infrared sensor may be able to detect radiation at one or more wavelengths and, by using infrared sensor data over time, multiple frequencies. The one or more bands may be frequency bands and/or wavelength bands.

The frequency of the radiation received may be divided by into one or more bands. Some flames may produce radiation having a frequency, such as flicker frequency, from 0 to 30 Hz. The amount of radiation at each of these frequencies may vary. In various embodiments, a main band may be for radiation from 6-15 Hz with side bands from 0-5 Hz and from 16-20 Hz. In some embodiments, the radiation received may be divided into bands based on wavelength. A main band may be, for example, centered around 4.2 microns and range from 3-7 microns while side bands may be below and above these wavelengths. In some embodiments, the sidebands may be ranges of equal size (e.g., 5 Hz, 2 microns, etc.). Alternatively, the side bands may be of different size ranges.

In some embodiments, a flame detector 10 may utilize one or more scenarios associated with the environment for detecting a flame. For example, a scenario may include radiation be in a main band but not in one or more side bands. A flame detector 10 may detect radiation indicative of a flame in the main band but if the radiation in one or more side bands does not confirm an indication of flame in a main band then a false alarm may be generated. Alternatively, in some embodiments, the radiation in a side band may be used to confirm an indication of a flame and generate a flame present signal to generate an indication of a flame.

In various embodiment, a flame from a first gas may generate radiation in a frequency main band of 16-20 Hz and also generate some radiation between 0-5 Hz. In another embodiment, the main band may be 5-13 Hz and side bands may be above and below the main band.

In various embodiments, the radiation sensed by the infrared sensor 202 may not be in the main band but may include radiation that is only outside of the main band, such as in a first sideband. The lack of radiation in the main band while receiving radiation in a side band may generate an indication of a false alarm.

In various embodiments, flame detector 10 may be configured to differentiate between infrared sources, such as fire or another source (e.g., a source of a false alarm), based on a main band and/or one or more side bands. For example, a light fixture may generate radiation (e.g., light) below 4 microns while a flame in a scenario may generate radiation below and above 4 microns. The infrared sensor 202 sensing radiation only below 4 microns may generate an indication of a false alarm.

Flame detector 10 may include one or more thermal cameras 204. In various embodiments, a thermal camera be configured to capture one or more thermal images containing thermal image data. Thermal images may contain multiple pixels, and each pixel may have a different intensity.

The intensity of the pixels of the thermal image may be associated with a temperature. A difference in the intensity of the pixels of the thermal image data may be associated with a difference between how hot and/or cold different environments captured in the thermal image are, including, but not limited to, equipment, devices, and/or individuals in the environment. For example, a pixel with a greater intensity may be associated with a higher temperature while a pixel with a lower intensity may be associated with a lower temperature. In various embodiments, comparison of the pixels of one or more images allows for the determination of which pixels are hot and cold, including the temperatures over time. The thermal camera 204 may generate thermal image data where the difference in the intensity allows for a quantification of temperature. In various embodiments, the thermal camera 204 may be configured for a spectral sensitivity for a range with filters, etc. In various embodiments, a thermal camera 204 may be configured for a specific spectral sensitivity. For example, various embodiments may have a thermal camera 204 with a spectral sensitivity in a range of 0.3 microns to 14 microns. Alternatively, a thermal camera 204 may have a spectral sensitivity in a range of 7-12 microns.

Flame detector 208 may include memory 208, which may be non-transitory and may include, for example, one or more volatile and/or non-volatile memories. In other words, for example, the memory 208 may be an electronic storage device (e.g., a computer readable storage medium). The memory 208 may be configured to store information, data, content, applications, instructions, or the like, for enabling the flame detector 10, including processor 120, to carry out various operations in accordance with example embodiments of the present disclosure. In this regard, the memory 208 may be preconfigured to include computer-coded instructions (e.g., computer program code), and/or dynamically be configured to store such computer-coded instructions for execution by the processor 210.

The flame detector 10 may be controlled by the processor 210. Processor 210 may be embodied in a number of different ways and may, for example, include one or more processing devices configured to perform independently. Additionally, or alternatively, the processor 210 may include one or more processors configured in tandem via a bus to enable independent execution of instructions, operations, pipelining, and/or multithreading. The use of the term "processor" may be understood to include a single core processor, a multi-core processor, multiple processors internal to the apparatus, and/or remote or "cloud" processors. Further, processor 210 may be embodied as one or more other processing devices or circuitry. The term circuitry may refer to an entirely hardware embodiment or a combination of hardware and computer program products. Thus, the processor 210 may be embodied as integrated circuits, application specific integrated circuits (ASICs), field programmable gate arrays (FPGAs), programmable logic arrays (PLAs), hardware accelerators, other circuitry, and/or the like.

Processor 210, which may be configured to execute instructions for conducting one or more operations, and these instructions may be stored in the memory 208 or otherwise accessible to the processor. Alternatively, or additionally, the processor 210 may be configured to execute hard-coded functionality. As such, whether configured by hardware, computer program products, software methods, or by a combination thereof, the processor 210 may represent an entity (e.g., physically embodied in circuitry) capable of performing operations according to an embodiment of the present disclosure. Alternatively, as another example, when the processor 210 is embodied as an executor of software instructions, the instructions may specifically configure the processor to perform algorithms and/or operations described herein when the instructions are executed.

Flame detector 10 may include a communications circuitry 212 that may enable the transmission of signals and/or data to other devices (such as, but not limited to, protection device(s) as shown in FIG. 1). In various embodiments, the signal may be an indication of a flame. The communications circuitry 212 may be any means such as a device or circuitry embodied in either hardware or a combination of hardware and software that is configured to receive and/or transmit a signal and/or data from/to a network and/or any other device, circuitry, or module in communication with the flame detector 10. In this regard, the communications circuitry 212 may include, for example, a network interface for enabling communications with a wired or wireless communication network. In various embodiments, the communications circuitry may include one or more transmitters to transmit a 4-20 mA signal, a digital signal, a wireless signal, etc. For example, the communications circuitry 212 may include one or more circuitries, network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). In various embodiments a signal may be pushed to a protection device or, alternatively, a signal may be transmitted to a protection device 40 in response to flame detector 10 receiving a signal, such as a polling request signal.

Flame detector 10 may include input/output circuitry 214 that may, in turn, be in communication with the processor 210 to receive an indication of an input from a user and to provide output to a user. The input/output circuitry 214 may comprise an interface, a mobile application, a kiosk, or the like. In some embodiments, the input/output circuitry 214 may also include a keyboard, a mouse, a joystick, a touch screen, touch areas, soft keys, a microphone, a speaker, or other input/output mechanisms. The processor 210 and/or input/output circuitry 214 may be configured to control one or more functions of one or more user interface elements through computer program instructions (e.g., software and/or firmware) stored on a memory accessible to the processor (e.g., memory 208). In some embodiments, the input/output circuitry 214 may include a trigger or button that may allow for a user to instruct the flame detector 10 to capture one or more images of an environment. Additionally, some embodiments may include input/output circuitry 214 such that a user may instruct the flame detector 10 to select one of infrared sensor 202 and/or thermal camera 204 to utilize and/or to transmit data to a protection device 40.

Flame detector 10 may include a display 216 that may be in communication with the processor 210 to display user interfaces (such as, but not limited to, display of flame detection signals, thermal images, thermal image data, infrared sensor data, thermal image data, etc.). In various examples of the present disclosure, the display 216 may include a liquid crystal display (LCD), a light-emitting diode (LED) display, a plasma (PDP) display, a quantum dot (QLED) display, and/or the like.

Having generally described embodiments of a flame detector 10 in accordance with the present invention, several exemplary operations according to exemplary embodiments will be described.

Exemplary Flame Detection Operations

In some example embodiments according to the operations described herein, a flame detector 10 may detect a flame and transmit a signal with an indication that the flame has been detected. FIGS. 3-5 illustrate flowcharts associated with these operations. While the following description includes multiple operations, it is readily appreciated that some of the following operations omitted and that additional operations may be included. As is also readily appreciated, some of these operations may be repeated. Additionally, the order of operations should not be interpreted as limiting as the order of these operations may be varied. The operations described herein may be executed by a flame detector 10, including by a processor 210, such as a processor 210 executing instructions stored in memory 208.

A flame detector 10 may generate infrared sensor data and capture thermal images, which may be used to determine if a flame is present or is not present, including if there are any false alarms indicating that the detection of a flame is false and that a flame has not been detected. The determination of a flame present may generate an indication of a flame detected, which may be transmitted in one or more signals to a protection device 40. In various embodiments, operations associated with the infrared sensor 202 and operations associated with the thermal camera 204 may occur in parallel or, alternatively, they may be operated sequentially.

FIG. 3 illustrates a flowchart according to an example method for generating an indication of flame detected in accordance with one or more embodiments of the present disclosure.

At operation 310, a flame detector 10 may acquire thermal image(s) and infrared sensor data. An infrared sensor 202 of flame detector 10 may capture radiation from the environment and generate infrared sensor data. A thermal camera 204 of flame detector 10 may capture one or more thermal images, each containing thermal image data. The infrared sensor data and the thermal image data may be stored in flame detector 10, such as in memory 208. The infrared sensor data, thermal images, and/or thermal image data may contain or be associated with metadata generated by flame detector 10. In various embodiments, the metadata may include, but it is not limited to, time stamps and/or sequence identifiers. The capture of infrared radiation by the infrared sensor 202 and of thermal images by the thermal camera 204 may occur at the same time or at nearly the same time, and each may be associated with a time stamp or sequence identifier. In various embodiments, the infrared sensor 202 and the thermal camera 204 may operate at the same rate (e.g., at 60 Hz) and metadata may contain timestamps associated with this rate. Alternatively, the rate at which the infrared sensor 202 may capture radiation and generate infrared sensor data may be different from the rate at which the thermal image camera 204 may capture thermal images and, thus, metadata may contain timestamps and sequence identifiers used to determine infrared sensor data and thermal images for a period of time as described herein.

At operation 320, a flame detector may determine spectral features, indications of flame, and indications of false alarms based on infrared sensor data. Additional operations associated with operation 320 are further described herein with regard to FIG. 4.

At operation 330, a flame detector 10 may determine indications of false alarm based on thermal image data. Additional operations associated with operation 330 are further described herein with regard to FIG. 5.

In various embodiments, image data and indications associated with operations 330 and 340 may be shared between these operations. For example, infrared sensor data may be used to determine one or more thresholds, and such thresholds may be used to differentiate one or more areas of interest of an image as hot or cold. Similarly, thermal image data may be used to determine a threshold and/or one or more areas of interest of an image. Such image data, thresholds, and/or identifications of areas of interest of an image may be shared between operations 320 and 330. For example, both the infrared sensor and the thermal camera may each see flicker in the radiation from a radiation source as well as a variation of intensity over a period of time. Thus the thermal image data and the infrared sensor data may be used to predict what should be seen in the image data of the other, including identifying one or more areas for of interest.

At operation 340, a flame detector 340 may combine indications and/or data associated with the infrared sensors and the thermal images. In various embodiments, this combining includes combining the infrared sensor data and the thermal image data. Additionally, or alternatively, this combining includes combining the indications and image data. The combined data may be used to determine if a flame is present. In various embodiments, the infrared sensor may be configured to detect a different band or wavelength radiation than the thermal camera and the combination of indications and data may improve flame detection.

In an exemplary embodiment, sunlight may be detected. Sunlight may have radiation at a wavelength that is detected by either of the thermal camera or the infrared sensor but not the other. The combination of the indications associated with the thermal camera and the infrared sensor may include an indication of a false alarm. Alternatively, or additionally, the combination may include only generating an alarm if both the indications associated with the thermal camera and the infrared sensor include indication of a flame.

At operation 350, a flame detector 10 may determine if a flame is present. Operation 350 includes determining if a flame is present based on the infrared sensor data, thermal image data, and associated indications. The determination may be based on the combined indications and image data. In various embodiments, the determination may be disregard one or more false alarms based on the combined data. For example, an indication of a flame present with no indications of false alarms based on the infrared sensor data may be used to determine a flame is present when there may be one or more indications of false alarms based on the thermal image data. Alternatively, or additionally, an indication of a flame present with an indication of at least one false alarm based on the infrared sensor data may be used to determine a flame is present when there may be no of false alarms based on the thermal image data. In various embodiments, the flame detector 10 may look for consistency between the indications based on the infrared sensor data indications based on the thermal image data.

In various embodiments the determination of a flame present may depend on, for example, the indications of false alarms, the portions of an image the false alarm may be associated with, the spectral features of the infrared sensor data, and/or a feature map associated with thermal image data. For example, if a false alarm is associated with image data for a portion of an image that is determined to be removed or disregarded, then a flame present may be determined even though an indication of a false alarm may also be present. Such an example may include a flame being detected in one portion of an image while a heater is operating in another portion of the image.

If it is determined that a flame is not present, the flame detector 10 may continue with its operations, and this may include iterating one or more operations. In various embodiments, this may include acquiring additional images and/or performing one or more operations based on previously acquired images that may have been stored in memory. For example, flame detector 10 may be using images acquired in a time period, such as one second, and each time a new image is acquired the flame detector 10 may perform operations described herein based on new images acquired as well as images stored in memory 208 to generate images for the next instance of the time period.

At operation 360, and on the determination that a flame is present, flame detector 10 may generate an indication of a flame detected. The indication of flame detected may be used to generate one or more signals to transmit the indication of flame detected. Such signals may be transmitted to one or more protection devices 40.

In various embodiments, a flame detector 10 may include machine learning. For example, machine learning algorithms may use infrared sensor data, thermal images, and/or thermal image data to determine if a flame is present. Additionally, or alternatively, machine learning may be used to determine spectral features of infrared sensor data and/or determine thermal features and/or feature maps from thermal images. The machine learning may utilize training sets of previously acquired images as well as previously generated determinations to train the machine learning model. The machine learning model may then be applied to newly acquired images to determine if a flame is present.

FIG. 4 illustrates a flowchart according to an example method for determining indications of a flame and indication of false alarms based on infrared sensor data in accordance with one or more embodiments of the present disclosure. In various embodiments, an indication of a false alarm may include that there are no false alarms.

At operation 410, a flame detector 10 may receive infrared sensor data. In various embodiments, the infrared sensor data may be provided directly from the infrared sensor 202, may be received from the memory 208, or a newly received infrared sensor data may be received from the infrared sensor 202 and may joined with infrared sensor data stored in memory. In various embodiments, the infrared sensor data may be received along with associated metadata, which may be used to generate a set of infrared sensor data to be used for generating determinations as described herein.

At operation 420, a flame detector 10 may determine spectral features of infrared sensor data, including power, wavelength, and frequency characteristics captured in an image. Spectral features may be determined based on the infrared sensor data associated with multiple infrared sensors. In various embodiments, spectral features may also be determined from the thermal image data, which may be input into operation 420.

Spectral features may include, but are not limited to, intensities, flicker characteristics, power spectrum densities, wavelength, spatial information, and/or areas of interest of an image. A flame includes a flicker characteristics including, but not limited to, flicker frequency and associated power densities, which may allow for the differentiation of a flame from other, non-flame, heat sources.

In various embodiments, the infrared sensor data generated by the infrared sensor 202 includes infrared sensor data of captured radiation at one or more wavelengths of infrared light. The infrared sensor data may include spectral information and the flame detector 10 may determine one or more a intensities associated with one or more portions of an environment based on the infrared sensor data. Various embodiments may include determining how much infrared radiation is being generated by a radiation source in the field of view of the infrared sensor 202, which may be used to generate a determination of spatial information associated with the infrared sensor data. In various embodiments, such spatial information may include a determination or an identification of one or more radiation sources as well as one or more portions of an image that are a background.

A flicker of a radiation source (e.g., a flame) may be associated with an power or intensity and/or a frequency. A Fourier transform may be applied to infrared sensor data, which may be applied to individual pixels or pixels of an area of interest. A Fourier transform may be applied to infrared sensor data containing changes in intensity of pixels over time. The Fourier transform may generate intensities at one or more frequencies to indicate how there may be a flicker in infrared sensor data. In comparison, the Fourier transform associated with other radiation sources aside from a flame may have distinct intensities at certain frequencies not associated with a flame. For example, a radiation source of a halogen lamp may not include any change in frequencies and, thus, the intensities at frequencies above zero hertz would be low or not present. In contrast, a flame flickers with a flickering frequency, which may be around 10 Hz. Though the flicker frequency of a flame may depend on a scenario associated with the environment. For example, a flame in an indoor environment may have a flicker at 10 Hz while a flame in an outdoor environment may have a different flicker frequency.

The conversion of the infrared sensor data to the frequency domain with a Fourier transform allows for a determination of a power spectrum density. For example, this power spectrum provides frequencies from 0 to 30 Hz and the energy at each of these frequencies. For example, a transform may include the energy at 0 Hz, 1 Hz, 2 Hz, . . . 30 Hz. In various embodiments, the Fourier transform may be used to generate one or more summations and/or thresholds to be applied in the determination of a flame present. For example, a summing of the power intensities from multiple frequency ranges may be compared. A first summation from 0 to 5 Hz may be compared to a second summation from 5 to 10 Hz. The power intensities and the ratios may be used with one or more flame scenarios described herein.

A ratio of the summation of the intensities in a first frequency band may be compared to a summation of the intensities in a second frequency band. In various embodiments, the sum of the intensities from 6-10 Hz may be compared to the sum of intensities from 0-5 Hz. In various embodiments with different sources of radiation having different flickering characteristics, the ratio of a flame may be greater than other sources of radiation such that the ratio is greater than a threshold (e.g., 1.0). If the ratio is below the threshold then a false alarm may be generated.

In various embodiments, the power density may be associated with wavelength. A flame detector 10 may utilize one or more bands based on the wavelength of the radiation. In various embodiments, a first band (e.g., 4-5 microns) having a greater power density than a second band (e.g., 5-6 microns) may be indicative of a flame. Conversely, a second band having a greater power density may be indicative of a false alarm. In various embodiments, the power densities of these bands may be based on sums or averages of intensities.

In various embodiments, an average power density may be used to determine a flame or a false alarm. A mean of radiation received for a band may be higher when a flame is present and lower when the radiation is not a flame but is an ambient condition, such as a reflection of sunlight. Additionally, or alternatively, an average across a time period may be used to identify if something is interfering with the transmission of the radiation, such as a chopper wheel or a hand being waived in front of a infrared sensor 202 or the thermal camera 204 of the flame detector 10. Such an average may also be paired with a frequency associated with the interference.

Statistical analysis of the power densities may be performed to generate the sums and ratio described herein in addition to other statistical values, such as a mean and/or median. In various embodiments, the ratios above may use the mean and/or median instead of the sum to compare radiation in different frequency bands. Additionally or alternatively, while the above examples describe using infrared sensor data to generate spectral features, thermal image data may be used in a similar manner to generate spectral features.

In various embodiments, a flame detector 10 may be analyzing one or more thermal images in parallel in real-time or near real-time. The flame detector 10 may receive thermal image data, such as from operations 520 or 530 of FIG. 5.

At operation 430, a flame detector 10 may determine one or more indications of a flame present based on the infrared sensor data. In various embodiments, one or more scenarios may be used to determine an indication of a flame. A scenario may be associated with, for example, the environment being monitored. For example, a flame in an indoor scenario may have a flicker characteristic with a larger (or smaller) power density between 5-10 Hz than between 0-5 Hz. The variation in the power density may be associated with differences in fuel sources, environmental conditions, etc. Additional scenarios may be used by flame detector 10 where different scenarios may have different frequency ranges and/or ratios of frequencies for use in determining if a flame is present. The scenario may, as described herein, be based on a type of fuel that may fuel the flame, such as gas or liquid to generate, respectively, a gaseous flame or a liquid flame. In various embodiments, a gaseous flame may have flickering characteristics between 12-15 Hz while a liquid flame may have flickering characteristics between 8-10 Hz.

A flame detector 10 may include the one or more scenarios. A scenario may be programmed or stored in memory 208 of a flame detector 10, which may be stored during calibration. Alternatively, and/or additionally, a scenario may be generated by a user using input/output circuitry 214 and/or transmitting one or more scenarios to the flame detector 10 via communications circuitry 212.

At operation 440, a flame detector 10 may determine one or more indications of a false alarm based on the infrared sensor data. The flame detector 10 may utilize the spectral features to determine a false alarm. For example, some false alarms have higher power at lower frequencies. In the indoor flame scenario, if the power density from the 0-5 Hz range is greater than the power density at the 5-10 Hz range, a false alarm may be generated. Additionally, one or more thresholds, including how large a difference in power density between summation of multiple frequencies may be used. Additionally, or alternatively, a summation exceeding or being below a threshold may be an indication of a false alarm. The spectral features may also analyze the periodicity of the change in power. For example, if there is a periodic raise or lowering of intensity, including if it is a steady rate of increase or decrease, that may be used to generate a false alarm as a flame is not associated with such periodicity.

In various embodiments, a flame detector 10 may acquire infrared sensor data of a environment including, among other things, sunlight reflected in a stainless steel portion of a piece of equipment. The flame detector 10 may determine one or more spectral features associated with the infrared sensor data. The infrared sensor data may include infrared sensor data associated with portions of the environment that are reflecting the sunlight and, thus, have a higher intensity in the infrared sensor data. The flame detector 10 may identify the portions of the infrared sensor data with higher intensities as areas of interest and the remaining portions of the image as background. In this determination one or more thresholds may be used to determine if the higher intensities in the image are not just relatively higher intensities but are associated with the intensity received from a flame. Such threshold(s) to determine an indications of flame may be based on one or more scenarios as described herein, which may be adjusted based on spectral features. The flame detector 10 may subsequently, or in parallel, determine if the radiation received from this radiation source of a stainless steel surface reflecting sunlight changes over times, in other words has a flicker. The flame detector 10 may determine that the reflection of sunlight in the stainless steel surface may be a false alarm as there is not a flicker characteristic associated with a flame. The flame detector 10 may thus have determined for the infrared sensor data associated with an environment an indication of a flame being present as well as an indication of a false alarm.

In various embodiments, the spectral features may include spatial information, which may be used to determine an indication of a flame present and indications of false alarms. In an example of sunlight captured by an infrared sensor, the spatial information may be determined from the infrared sensor data. The determination may also be based on one or more scenarios. While the portions of the infrared sensor data associated with the sunlight may exceed one or more thresholds associated with a flame, spatial information associated with the sunlight may position the sun is floating in the sky. This may generate an indication of a false alarm based on the infrared sensor data.

In various embodiments, a flame detector 10 may capture infrared sensor data of sunlight reflected in water. The flame detector 10 may determine spectral features including intensities, flicker characteristics, and spatial information. The relative intensities of the infrared sensor data may be used to determine spatial information of an area of interest. The area of interest may include flickering in the area of interest. The flicker characteristic may be sufficiently close to the flicker of a flame not to generate a false alarm based on the flicker characteristic. A spectral feature based on intensities of pixels of infrared radiation may then be determined. The threshold may be associated with an intensity of infrared radiation associated with a flame, which may be based on one or more scenarios. Based on the area, the intensity threshold may be used to determine that the intensities of infrared radiation received in the first area are lower than the intensity threshold. Thus an indication of a false alarm may be generated.

In various embodiments, scenarios may be used to define where and when a flame is expected to be present. A scenario associates with a flare stack in an industrial environment may be expected to include a flame at specific times or flames occurring at specific frequencies. A flame detector 10 detecting a flame in such an environment may base indications of false alarms based on a scenario expecting a flame at defined spatial locations and/or times. Thus if the flame detector 10 generated an indication of a flame present in the defined spatial locations and/or times, an indication of a false alarm may be generated based on the scenario.

In various embodiments, thermal features and/or a feature map based on thermal features may be included in determining an indication of a flame present and or indication of a false alarm based on infrared sensor data. For example, in various embodiments, a feature map may indicate one or more areas for infrared sensor data to be used in determining indications. Additionally, or alternatively, if an area of interest is identified based on infrared sensor data but not identified in a feature map, then an indication of a false alarm may be generated.

FIG. 5 illustrates a flowchart according to an example method for determining indications of a flame and false alarms based on thermal data in accordance with one or more embodiments of the present disclosure. In various embodiments, the indication of a flame may include that there are no flames. In various embodiments, an indication of a false alarm may include that there are no false alarms.

At operation 510, a flame detector 10 may receive thermal image(s). The thermal images may be provided directly from the thermal camera 204 or may be received from the memory 208. In various embodiments, the thermal image(s) may be received along with associated metadata.

At operation 520, a flame detector 10 may determine thermal feature of the thermal image(s). In various embodiments, the flame detector 10 may receive infrared sensor data, such as spectral features, such as from operation 420 of FIG. 4. In various embodiments, determining thermal features may include classifications. Classifications may be, for example, based on a comparison of one or more pixels and/or one or more areas of interest in thermal image data.

Classifications may be based on one or more thresholds. For example, multiple pixels may be compared against a threshold, and if a first pixel exceeds a threshold and a second pixel does not exceed a threshold then the first pixel may be classified with an indication of a flame being present and the second pixel may be classified as no flame being present. Classifications may be stored as metadata.

In various embodiments, infrared sensor data may include data associated with one or more side bands as described herein. The infrared sensor data associated with the one or more sidebands may be used to differentiate a flame from a false alarm. For example, the spectral information in the infrared sensor data associated with the side band may be used. Classification data may include if the thermal image data is associated with a main band or a side band. In various embodiments, scenarios may include sideband ratios to different an indication of a flame from a false alarm.

At operation 530, a flame detector 10 may generate a feature map based on one or more thermal features. In various embodiments, the feature map may also be based on the spectral features and/or infrared sensor data. The feature map may be generated by background subtraction, thresholding, edge and corner detection, etc. The feature map may be used to identify one or more portions of a thermal image, such as the hottest areas and/or background areas. The feature map data or portions of the feature map data may be used in the determination of spectral features at operation 420, the indication of a flame at operation 430, and/or the indication of a false alarm at 440.

In various embodiments, a feature map may be generated to generate an indication of one or more areas of interest, such as one or more hot areas of an image. For each thermal image, each pixel may represent a temperature. By comparing the intensity of each pixel, one or more portions of the thermal image may be identified as being the hottest portion(s) of the thermal image. A threshold may be predetermined, or a threshold may be determined based on the thermal image. For example, an average of the intensity of the pixels in an image may be used. Alternatively, or additionally, an average of the pixels in a portion of the image may be used to determine an average value, which may be used to generate a threshold.

In various embodiments, spectral feature data may be used to identify an area of interest in a thermal image, such as determining the portion of an image associated with a background data representing a background of an image and a portion of an image associated with an area of interest. A determination of background data is based on, for example, determining one or more portions of an image with above one or more thresholds or the portion that has the highest intensity, which may represent the hottest portion of an image. The determination of an identity of background data may be used to remove the background data from consideration of a flame being present. In various embodiments, removing background data may delete the background data from thermal image data. Alternatively, or additionally, removing background data may include that if an indication of a flame present is from a portion of a thermal image associated with background data then a false alarm be generated. A further alternative, or addition, removing background data may be by identifying background data at a certain frequency or wavelength and attenuating the data at such frequencies or wavelengths. Background data may identified from infrared sensor data based on the spectral features described herein, such as where a spectral feature is not indicative of a flame or associated with a non-flame radiation source.

At operation 540, a flame detector 10 may determine one or more indications of false alarms based on a feature map. A false alarm may include, for example, a radiation source that is determined not to be a flame. In various embodiments, the radiation source may be a halogen lamp. The thermal images of a halogen lamp may generate a false alarm, which may be due to the thermal images of a halogen lamp including different and distinct pixels and/or patterns of pixels from thermal images including a flame. A flame flickers, which includes movement. In contrast, a fixed source of radiation, such as a halogen lamp, may have a constant source of radiation. A flame may have the same intensity as a halogen lamp, but the behavior of the radiation source over time is different between a flame and a halogen lamp. A constant source of radiation may include a thermal image that does not change, including a first pixel in a location in a first thermal image at a first time being at a first value and a second pixel in the location in a second thermal image at a second time being at the first value. The determination of a lack of a change in the thermal images based on the pixels may generate an indication of a false alarm.

In various embodiments, one or more spectral features may be received from, for example, operation 420, and may include flicker frequency data and/or indications of one or more areas of interest. Based on the flicker frequency data, such as there being a flicker frequency associated with a flame or there being a flicker frequency of zero (e.g., the radiation source being constant), an indication of a false alarm may be determined. Based on the spectral features' indications of one or more areas of interest, if there are no areas of interest based on thermal image data and/or different areas of interest based on thermal image data, then an indication of a false alarm based on the thermal image data may be generated.

Operations of the present invention have been described in flowcharts. As will be appreciated, computer program instructions may be loaded onto a computer or other programmable apparatus (e.g., hardware) to produce a machine, such that the resulting computer or other programmable apparatus implements the functions and/or operations described in the flowchart blocks herein. These computer program instructions may also be stored in a computer-readable memory that may direct a computer or other programmable apparatus to function in a particular manner, such that the instructions stored in the computer-readable memory produce an article of manufacture, the execution of which implements the functions and/or operations described in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions and/or operations specified in the flowchart blocks. The flowchart blocks support combinations of means for performing the specified functions and combinations of operations for performing the specified functions and/or operations. It will be understood that one or more blocks of the flowcharts, and combinations of blocks in the flowcharts, can be implemented by special purpose hardware-based computer systems which perform the specified functions and/or operations, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results. Thus, while particular embodiments of the subject matter have been described, other embodiments are within the scope of the following claims.

The invention claimed is:

1. A flame detection apparatus comprising:
   a thermal camera configured to generate thermal image data;
   an infrared sensor configured to generate infrared sensor data;
   a processor operably connected with the thermal camera and the infrared sensor, wherein
   the processor is configured to:
      receive thermal image data from the thermal camera;
      receive infrared sensor data from the infrared sensor;
      generate one or more spectral features based on at least one of the thermal image data and the infrared sensor data;
      generate a feature map based thermal image data;
      generate, based on the spectral features and the feature map, an indication of a flame present and an indication of a false alarm;
      determine an indication of flame detected based on the indication of flame present and the indication of a false alarm; and
      transmit, based on the indication of flame detected, an alarm signal.

2. The flame detection apparatus of claim 1, wherein the infrared sensor is configured to generate infrared sensor data at 4.3 microns.

3. The flame detection apparatus of claim 1, wherein the infrared sensor is configured to generate infrared sensor data at 2.7 microns.

4. The flame detection apparatus of claim 1, wherein the thermal camera is configured to generate thermal image data between 3 to 14 microns.

5. The flame detection apparatus of claim 1, wherein the spectral features include a flicker characteristic.

6. The flame detection apparatus of claim 1, wherein the spectral features include one or more areas of interest, wherein the area of interest is determined for one or more thermal images based on the infrared sensor data.

7. The flame detection apparatus of claim 1 further comprising a transmitter configured to transmit a 4-20 mA signal, and wherein the process is further configured to transmit the alarm signal as the 4-20 mA signal.

8. A method of flame detection comprising:
   receiving thermal image data from a thermal camera;
   receiving infrared sensor data from an infrared sensor;
   generating one or more spectral features based on at least one of the thermal image data and the infrared sensor data;
   generating a feature map based thermal image data;
   generating, based on the spectral features and the feature map, an indication of a flame present and an indication of a false alarm;
   determining an indication of flame detected based on the indication of flame present and the indication of a false alarm; and
   transmitting, based on the indication of flame detected, an alarm signal.

9. The method of claim 8, wherein the infrared sensor is configured to generate infrared sensor data at 4.3 microns.

10. The method of claim 8, wherein the infrared sensor is configured to generate infrared sensor data at 2.7 microns.

11. The method of claim 8, wherein the thermal camera is configured to generate thermal image data between 3 to 14 microns.

12. The method of claim 8, wherein the spectral features include a flicker characteristic.

13. The method of claim 8, wherein the spectral features include one or more areas of interest, wherein the area of interest is determined for one or more thermal images based on the infrared sensor data.

14. The method of claim 8 further, wherein transmitting the alarm signal comprises transmitting a 4-20 mA signal.

15. A non-transitory computer-readable storage medium having computer executable program code instructions therein the computer executable program code instructions comprising program code instructions configured, upon execution, for: receiving thermal image data from a thermal camera; receiving infrared sensor data from an infrared sensor; generating one or more spectral features based on at least one of the thermal image data and the infrared sensor data; generating a feature map based thermal image data; generating, based on the spectral features and the feature map, an indication of a flame present and an indication of a false alarm; determining an indication of flame detected based on the indication of flame present and the indication of a false alarm; and transmitting, based on the indication of flame detected, an alarm signal.

16. The non-transitory computer-readable storage medium of claim 15, wherein the infrared sensor is configured to generate infrared sensor data at 4.3 microns.

17. The non-transitory computer-readable storage medium product of claim 15, wherein the infrared sensor is configured to generate infrared sensor data at 2.7 microns.

18. The non-transitory computer-readable storage medium of claim 15, wherein the thermal camera is configured to generate thermal image data between 3 to 14 microns.

19. The non-transitory computer-readable storage medium of claim 15, wherein the spectral features include a flicker characteristic.

20. The non-transitory computer-readable storage medium of claim 15, wherein the spectral features include one or more areas of interest, wherein the area of interest is determined for one or more thermal images based on the infrared sensor data.

* * * * *